(12) United States Patent
Felder et al.

(10) Patent No.: US 6,370,244 B1
(45) Date of Patent: Apr. 9, 2002

(54) EFFICIENT DIGITAL ITU-COMPLIANT ZERO-BUFFERING DTMF DETECTION USING THE NON-UNIFORM DISCRETE FOURIER TRANSFORM

(75) Inventors: Matthew D. Felder; James C. Mason; Brian L. Evans, all of Austin, TX (US)

(73) Assignee: Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 09/054,872

(22) Filed: Apr. 3, 1998

(51) Int. Cl.$^7$ .............................................. H04M 3/00
(52) U.S. Cl. ...................... 379/386; 379/283
(58) Field of Search ............................ 379/23, 31–32, 379/282–284, 296, 338–339, 346, 351.361, 386; 324/76.39, 76.44, 76.47, 76.54–76.58; 364/724.09; 370/526; 375/225, 227; 455/63, 67.3, 226.2

(56) References Cited

U.S. PATENT DOCUMENTS

| | | | |
|---|---|---|---|
| 3,571,522 A | 3/1971 | Cox | 179/84 |
| 4,689,760 A | 8/1987 | Lee et al. | 370/110.3 |
| 5,138,569 A | 8/1992 | Valenzuela | 364/724.09 |
| 5,214,693 A | 5/1993 | Chujo | 379/386 |
| 5,257,309 A | 10/1993 | Brandman et al. | 379/283 |
| 5,319,703 A | 6/1994 | Drory | 379/351 |
| 5,325,427 A * | 6/1994 | Dighe | 379/386 |
| 5,333,191 A | 7/1994 | McCarthy | 379/386 |
| 5,353,345 A | 10/1994 | Galand | 379/386 |
| 5,392,348 A | 2/1995 | Park et al. | 379/386 |
| 5,408,529 A | 4/1995 | Greaves | 379/386 |
| 5,426,696 A * | 6/1995 | Zimbrek | 379/386 |
| 5,428,680 A | 6/1995 | Murata et al. | 379/386 |
| 5,495,526 A | 2/1996 | Cesaro et al. | 379/386 |
| 5,588,053 A | 12/1996 | Xie | 379/386 |
| 5,619,564 A * | 4/1997 | Canniff et al. | 379/351 |
| 5,644,634 A | 7/1997 | Xie et al. | 379/386 |
| 5,937,059 A * | 8/1999 | Kim et al. | 379/386 |
| 5,995,557 A * | 11/1999 | Srinivasan | 379/386 |

OTHER PUBLICATIONS

Mock, "Add DTMF generation and decoding to DSP—$\mu$ Designs, " Telecomm/Datacomm Special Issue.

Guy, et al., "Algorithms for Multi–Channel DTMF detection for the WE® DSP32 family" Proc. IEEE Int. Conf. on Acoustics, Speech, and Signal Processing, May 1989, pp. 1134–1137.

Arslan, et al., "Performance Evaluation and Real–Time Implementation of Subspace, Adaptive, and DFT Algorithms for Multitone Detection, " Proc. IEEE Int. Conf. on Telecommunications, Apr. 15–17, 1996, pp. 884–887.

Beard, et al., "A Discrete Fourier Transform Based Digital DTMF Detection Algorithm, " Ms State DSP Conference, Fall 1995, pp. 59–71.

\* cited by examiner

*Primary Examiner*—Curtis Kuntz
*Assistant Examiner*—George Eng
(74) *Attorney, Agent, or Firm*—Patrick Stellitano

(57) ABSTRACT

Computationally efficient DTMF detection methods and apparatus are presented that meet all of the ITU recommendations using the modified non-uniform DFT. The system of the present invention employs a high band filter block and two low band filter blocks to detect power at the 8 DTMF tones. The frame length of the high band filter blocks is one half the length of the low band filter blocks. The frame lengths are chosen to meet the ITU frequency selectivity requirements for all DTMF frequencies. The frames of the two low band filter blocks are staggered to produce outputs alternately, and are aligned with respect to the frame of the high band filter block to produce low band filter block outputs that coincided with the high band filter block outputs without the need for signal buffering. A system of power level tests are employed in conjunction with a system of timing tests to ensure that all ITU timing and frequency constraints are met. The present invention requires no buffering of input samples, and can perform DTMF decoding of 24 telephone channels of a T1 time-division multiplexed communication line, using a single fixed-point commercially available digital signal processor.

10 Claims, 12 Drawing Sheets

| DTMF Key pad | 1209 Hz | 1336 Hz | 1477 Hz | 1633 Hz |
|---|---|---|---|---|
| 697 Hz | 1 | 2 | 3 | A |
| 770 Hz | 4 | 5 | 6 | B |
| 852 Hz | 7 | 8 | 9 | C |
| 941 Hz | * | 0 | # | D |

| TABLE 1 | | |
|---|---|---|
| DTMF Signal Frequencies: | Low Group: 697, 770, 852, 941 Hz | |
| | High Group: 1209, 1336, 1477, 1633 Hz | |
| First Harmonics | Low Group: 1394, 1540, 1704, 1882 | |
| | High Group: 2418, 2672, 2954, 3266 | |
| Frequency Tolerance: | Operation: | <=1.5% |
| | Non-operation: | >=3.5% |
| Signal Duration: | Operation: | 40 ms min. |
| | Non-operation: | 23 ms max. |
| Pause Duration: | | 40 ms max. |
| Signal Interruption: | | 10 ms min. |
| Twist: | Forward: | 8 dB |
| | Reverse: | 4 db |

| TABLE 2 | | | | | | | | |
|---|---|---|---|---|---|---|---|---|
| N | Low Frequency Group | | | | High Frequency Group | | | |
| | 697 Hz | | 941 Hz | | 1209 Hz | | 1633 Hz | |
| | 1.5% | 3.5% | 1.5% | 3.5% | 1.5% | 3.5% | 1.5% | 3.5% |
| 106 | 1.07 | ~~1.41~~ | 1.14 | ~~1.88~~ | 1.23 | 3.11 | 1.44 | 11.6 |
| 165 | 1.18 | ~~2.40~~ | 1.35 | 6.03 | 1.65 | 45.8 | ~~2.53~~ | 45.0 |
| 212 | 1.32 | 4.94 | 1.65 | 46.1 | ~~2.32~~ | 84.5 | ~~5.34~~ | 22.3 |

| R | 1209 Hz | 1336 Hz | 1477 Hz | 1633 Hz |
|---|---|---|---|---|
| 697 Hz | 1.15 | 1.07 | 1.01 | 1.01 |
| 770 Hz | 1.15 | 1.07 | 0.99 | 0.85 |
| 852 Hz | 1.15 | 1.07 | 0.99 | 0.85 |
| 941 Hz | 1.18 | 1.07 | 0.99 | 0.85 |

Table 3

| R | 1209 Hz | 1336 Hz | 1477 Hz | 1633 Hz |
|---|---|---|---|---|
| 697 Hz | 1.28 | 1.26 | 1.21 | 1.18 |
| 770 Hz | 1.24 | 1.23 | 1.20 | 1.16 |
| 852 Hz | 1.16 | 1.19 | 1.16 | 1.11 |
| 941 Hz | 1.06 | 1.13 | 1.10 | 1.06 |

Table 4

EFFICIENT DIGITAL ITU-COMPLIANT ZERO-BUFFERING DTMF DETECTION USING THE NON-UNIFORM DISCRETE FOURIER TRANSFORM

TECHNICAL FIELD

The present invention relates to methods and apparatus for the detection of DTMF symbols.

BACKGROUND OF THE INVENTION

Dual-tone multiple frequency (DTMF) signaling is used in telephone dialing, voice mail, and electronic banking systems. A DTMF signal corresponds to one of sixteen touchtone symbols (0–9, A–D, #, *) as shown in FIG. 1. Each symbol is represented by one of four frequencies in a low frequency band and one of four frequencies in a higher frequency band. In FIG. 1 the symbols are shown in a matrix format. Each symbol is represented by a frequency representing the column in which the symbol appears and by a frequency representing the row in which the symbol appears. The columns are represented by frequencies in a band between 1 kHz (kilo-Hertz) and 2 kHz, and the rows are represented by frequencies in a band between 500 Hz and 1 kHz. The first three columns of symbols form the telephone keypad layout familiar to consumers of voice telephone services. The last column of symbols are available for more particularized applications. Whenever a key of a touch-tone keypad is depressed, the high frequency and the low frequency corresponding to the symbol assigned to that key is generated and transmitted to a receiving device. The device that receives this dual tone signal must detect which one of the four low frequencies and which one of the four high frequencies have been received in order to determine which symbol has been transmitted.

The problem of DTMF signal detection is non-trivial for several reasons. The eight frequencies used to encode the symbols are within the spectrum of frequencies generated by voice-data. Therefore, when voice data is transmitted, symbol simulation, (also called digit simulation), may occur. A DTMF detector must be able to discriminate against these voice-simulated symbols. Also, the DTMF signal is attenuated by the transmission medium through which it is transmitted. Typical transmission media attenuate high frequencies more than low frequencies. Thus, the higher frequency in the dual tone pair may have significantly less power at the receiver than the low frequency in the pair. Conversely, devices do not typically generate all DTMF frequencies at the same power level. It is therefore possible for the lower frequency to be received at a lower power level than the high frequency. This disparity in power between the low and high frequency is called "twist". Further, both tones must be detected in the presence of noise power which may be a significant fraction of the signal power of the received DTMF signal. An additional problem is that not all devices will generate the exact dual tone frequencies shown in FIG. 1 because of poor design or system degradation. The DTMF receiver must be able to detect the DTMF signals at frequencies slightly offset from the nominal values while rejecting frequencies outside a given tolerance band. Because the nominal DTMF frequencies are closely spaced, the tolerance band must be very narrow. The problem of signal detection within narrow frequency bands is complicated by the fact that each signal is transmitted only for a short time duration of uncertain length with an uncertain delay time between transmission of successive symbols.

To standardize the performance of devices for DTMF signal generation and reception, the International Telecommunications Union (ITU) has developed a set of performance standards to which these devices should comply. These standards have achieved virtually worldwide acceptance, and refine the standards previously developed by Bell Communications Research, Inc. ("Bellcore"). The ITU standards are summarized in Table 1. Voice-simulated tones must be rejected as invalid tones. Signal frequencies that are within +/−1.5% of the nominal frequencies listed should be detected as valid DTMF tones. A signal frequency outside the band of +/−3.5% of a nominal frequency must be rejected as an invalid tone. Two twist parameters are also specified. The twist, which is the ratio of the low frequency power to the high frequency power in deci-Bels (dB), is specified to be greater than −4 dB and less than 8 dB. A positive twist value is a forward twist condition, which is the case when the low frequency signal power exceeds the high frequency power. A negative twist value is a reverse twist condition which exists when the high frequency signal power exceeds the low frequency signal power. When the twist is within the range of +4 dB to +8 db, the signal must be accepted as valid. Also, according to Bellcore standards, a valid DTMF signal must be detected if the signal-to-noise ratio (SNR) is at least 15 dB. In addition to frequency and power tolerances, temporal constraints are also imposed. A DTMF signal of duration at least 40 msec (milli-seconds) must be detected. A signal of duration 23 msec or less must be rejected. Also, if the time between the end of one DTMF signal and the beginning of the next successive DTMF signal, the interdigit time, is at least than 40 msec, the signals must be distinguished as two distinct symbols. Conversely, a signal interruption of 10 msec or less must not cause detection of two separate tones.

Within the telephone network, DTMF signals are typically transmitted digitally at a sampling rate of about 8 kHz (8000 samples per second), to give sample durations of approximately 0.125 msec. One way to detect the presence of a valid DTMF signal is by digital-to-analog conversion followed by a bank of analog filters centered at the nominal DTMF frequencies. This method is not efficient because of the required conversion process and the size and complexity of analog filter implementation. It is more desirable to achieve DTMF signal detection using digital methods which can be implemented by an integrated circuit digital signal processor.

The most common digital methods for DTMF detection involve repetitively or iteratively computing the frequency content of the received signal over a finite duration of time referred to as a frame. For each frame, the power at each frequency of interest is determined. Once the power at each desired frequency is detected, a decision process, in the form of a series of tests, is usually employed to determine whether a valid DTMF signal has been detected. For example, voice-simulated DTMF signal tones can be discriminated by computing the signal power at the first harmonic of the fundamental DTMF signal tones listed in Table 1. A DTMF signal that is not voice-simulated will have little or no signal power at these harmonics, whereas the spectrum of a voice signal usually does generate these harmonics at significant power levels. To discriminate against voice-simulated tones, the power level at harmonic frequencies of the fundamental DTMF frequencies can be compared to specified threshold values. If the power in any of the harmonics exceeds the given threshold for that harmonic, a decision is made that an invalid detection has occurred. To determine if a valid tone has been detected, the DTMF frequency in the high band at which the power is greatest is determined. Similarly, the DTMF frequency in the low band at which the power is greatest is also determined. Each of these signals must exceed a certain threshold power or a decision is made that no valid DTMF signal has been detected within the current frame. For static thresholding, the threshold is a fixed, predetermined amount. For dynamic thresholding, the threshold is the minimum amount by which the power in the strongest tone in the band must exceed the power of the signals at the other three DTMF frequencies in the band. Further, the power of the strongest tone in the high band is compared to the power of the strongest tone in the low band to determine if the twist is within the range of −4 dB to 8 dB.

One approach to analyzing the frequency content of the received signal is by use of a Fast Fourier Transform (FFT) algorithm. The FFT would produce a sampled frequency spectrum with equally spaced samples. To obtain the frequency resolution required to detect signals within +/−1.5% of a nominal DTMF frequency at a sample rate of 8 kHz, an FFT of at least 256 points would be required. The number of computations required to implement an N-point FFT is proportional to $N\log_2 N$. However, since the frequency spectrum needs to be computed at only a small number of frequencies, (8 DTMF frequencies plus some harmonics), it is more efficient to compute the Discrete Fourier Transform (DFT) at these particular frequencies. Further, since it is desirable to process the signal in real time as it is received, without the need to store a large number of samples in a buffer, the Goertzel filter is commonly employed. The Goertzel filter is an implementation of the DFT as a digital filter which is structured to reduce the number of computations required to compute the transform. The number of computations to compute the spectrum of a signal of N samples at M discrete frequencies using the Goertzel filter is proportional to N*M. When the number M is less than $\log_2 N$, the Goertzel method requires fewer computations than the FFT. The transfer function implemented by the Goertzel filter is:

$$H_k(z) = \frac{1 - e^{-j\left(2\pi\frac{k}{N}\right)}z^{-1}}{1 - 2\cos\left(2\pi\frac{k}{N}\right)z^{-1} + z^{-2}} \quad (1)$$

This filter requires no signal buffering because each sample is processed when received. Given a sequence of N samples, the Goertzel filter produces the energy at a frequency that is an integer multiple of $2\pi/N$ (in radians). However, since the DTMF tones are not equally spaced in frequency, there is no single value of N for which $H_k(z)$ can be computed precisely at all 8 DTMF frequencies for any set of integers, k. One way to overcome this problem is to take N sufficiently large so that k/N will be arbitrarily close to each of the 8 DTMF frequencies (normalized by N) for some values of k. However, in order to achieve the required frequency resolution, the frame size, N, would have to be so large that it would not be possible to determine whether the received signal was less than 23 msec or greater than 40 msec in duration. Another approach is to use a different frame size for each DTMF frequency, choosing N for each frequency such that k/N is arbitrarily close to the desired normalized frequency for some value of k, consistent with the frame size required to discriminate signals of valid duration. However, this approach results in considerable computational complexity and increased data storage due to the processing of signals accumulated over different durations of time. A better approach is to alter the Goertzel filter to compute the z-transform at the precise frequencies of interest. The altered Goertzel filter is obtained from the transfer function of equation (1) by replacing k with the exact frequency of interest $f_1$ and N with the sampling frequency $f_2$. This implementation is referred to as the Non-uniform DFT (NDFT). Further simplification can be achieved by modification of the algorithm to compute signal power rather than signal energy, since only signal power is needed for DTMF detection. This eliminates the need for complex multiplication to implement the transfer function of equation (1). Implementation of the modified NDFT results in a considerable reduction in computational complexity, since it can be implemented using 3N real multiplications/additions and four words of memory. Therefore, the modified NDFT may be used to detect power at the exact DTMF frequencies and the selected harmonics efficiently, within the limits of machine precision.

Computing the frequency spectrum of the received signal over a finite-length frame is equivalent to determining the frequency content of the received signal multiplied by a rectangular window. In continuous time, rectangular windowing corresponds to convolving the frequency spectrum of the received signal with a sine function:

$$\frac{\sin(2\pi f/N)}{2\pi f/N} \quad (2)$$

An example of this function is shown in FIG. 2. The effect of windowing in the time domain is to spread the tonal energy of the DTMF signal in the frequency domain. The sidelobes of the windowing function can be reduced by using a tapered window such as a Hamming window or other tapered windowing function. However, using a tapered window increases the width of the main lobe, thereby reducing frequency selectivity. Increasing the window size narrows the width of the main lobe, thereby increasing frequency selectivity. However, increasing the window size increases the difficulty in meeting the ITU timing specifications.

Prior art methods have used a frame size of about 13.3 msec which corresponds to a frame of 106 samples at the standard nominal sampling rate of 8000 samples per second. This frame size guarantees that a signal of at least 40 msec duration would fill at least two frames. After the conclusion of each frame, the detected signal in the current frame is compared to the detected signal of the previous two frames. If the result of the current frame is the same as the previous frame, but different from that of the frame before the previous frame, then a decision is made that a new valid DTMF signal has been found. However, this decision logic will incorrectly detect two distinct signals when a brief interruption occurs, because a 10 msec interruption will generate an invalid frame. Also, a signal of 20 msec duration that is centered between two frames could incorrectly result in a valid DTMF detection, even though the signal is less than 23 msec in duration.

Moreover, a 106-sample frame will not meet the ITU frequency specifications for all frequencies. In particular, the detector would be unable to reject frequencies in the low band frequency group that fall outside the +/−3.5% band centered at each DTMF frequency. A larger frame size would be necessary to meet the frequency rejection specification in the low band. However, increasing the frame size has two negative effects. First, a longer frame duration makes it difficult to meet the signal timing specifications. Second, a larger frame size increases the selectivity of the filter, making it more likely to reject frequencies within the +/−1.5% band pass region centered at the DTMF frequencies in the high band. In fact, no single frame size has been reported that will satisfy all of the ITU specifications.

As already noted, different frame sizes could be used for different DTMF frequencies at the expense of increased computational complexity and data storage requirements. Using frames of different lengths implies accumulation of the received samples over different time durations for different DTMF frequencies. Therefore, the outputs of the NDFT filters at each DTMF frequency will occur at different rates, making it difficult to achieve a meaningful comparison of power levels at different DTMF frequencies over the same time interval without the necessity of storing the received samples in a data buffer. The cost of increased storage and computational complexity to implement multiple frame lengths with signal buffering is considerable, especially for devices that must simultaneously process multiple channels. Therefore, there is great need for a computationally efficient DTMF detection method that meets all of the ITU specifications without the necessity of signal buffering.

SUMMARY OF THE INVENTION

An object of the present invention is to provide apparatus and methods for DTMF detection that minimize computational complexity and data storage requirements and that meet all ITU specifications.

The present invention comprises a high band filter block with four filters that detect power at each of the four high band DTMF tones, two low band filter blocks, each with four filters, that detect power at each of the four low band DTMF tones, and two filters for detecting power at the harmonic frequencies of the high and low band tones. The frame length of each low band filter block is twice the frame length of the high band filter block and is chosen to meet the ITU frequency selectivity requirements for both the high and low band tones. The frames of the low band filter blocks are staggered by a duration of time equal to the frame length of the high band filter block, and are aligned to start and end concurrently with the high band filter block frames. In this way, the outputs of the low band filter blocks alternate and coincide with the outputs of the high band filter block, so that a low band and high band result is obtained at the end of each high band frame without the need for signal buffering. This results in a substantial reduction in data storage requirements.

The present invention comprises methods for implementing power level tests that result in improved DTMF detection and voice rejection while meeting the ITU frequency and timing constraints. Improved performance and sensitivity is achieved by basing detection decisions on power levels determined over the average of two high band frames and one low band frame of twice the length as the high band frames.

At the end of each high band frame, a harmonic power level test is applied only to the symbol detected in the previous frames. This reduces the total number of filters required. Improved rejection of voice-simulated symbols is achieved by applying a harmonic power level test only to the high band tones, and not the low band tones, when one of the symbols "2," "6," or "C" has been detected in the previous frame, because the harmonic frequencies of the low band tones for these three symbols are too close to their high band tones to provide rejection that exceeds what can be achieved by a total power test. A total power check that improves performance by detecting valid DTMF signals at lower signal-to-noise ratios is achieved by experimentally determining an optimal threshold ratio for each DTMF symbol.

The present invention also provides a finite state machine that ensures that all of the ITU timing constraints are met. A length test is imposed which ensures that a signal of duration 23 msec or less will be rejected while ensuring that a DTMF signal that is at least 40 msec long is accepted. A pause test is imposed which ensures that an interdigit time of 10 msec or less will not result in an erroneous detection of two successive symbols, while ensuring that a pause of at least 40 msec will result in detection of two successive symbols.

An embodiment of the present invention meets the ITU specifications by using the Non-uniform Discrete Fourier Transform (NDFT) in conjunction with dual-windowing and a computationally efficient finite-state machine. The present invention requires no buffering of input data, and is simple enough to decode 24 digitized telephone channels of a time-division multiplexed $T_1$, line (1.544 Megabits/second) using a standard single fixed-point digital signal processor (DSP).

These and other features, aspects, and advantages of the present invention will become better understood with reference to the following description, appended claims, and drawings.

BRIEF DESCRIPTION OF THE DRAWINGS

Table 1 is a table of the ITU specifications for DTMF detectors;

Table 2 is a table of results of frequency selectivity tests;

Figure 2:
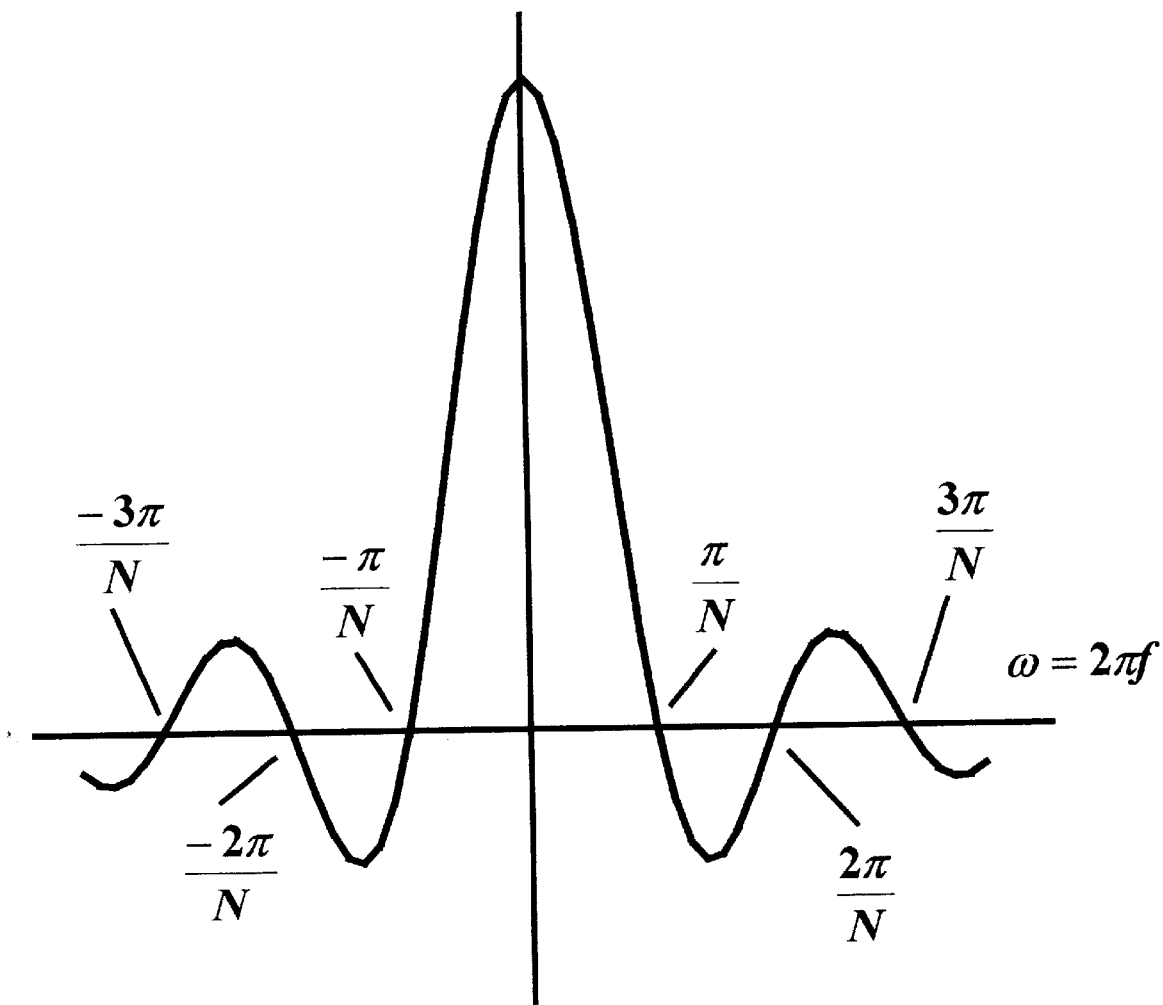
Figure 3:
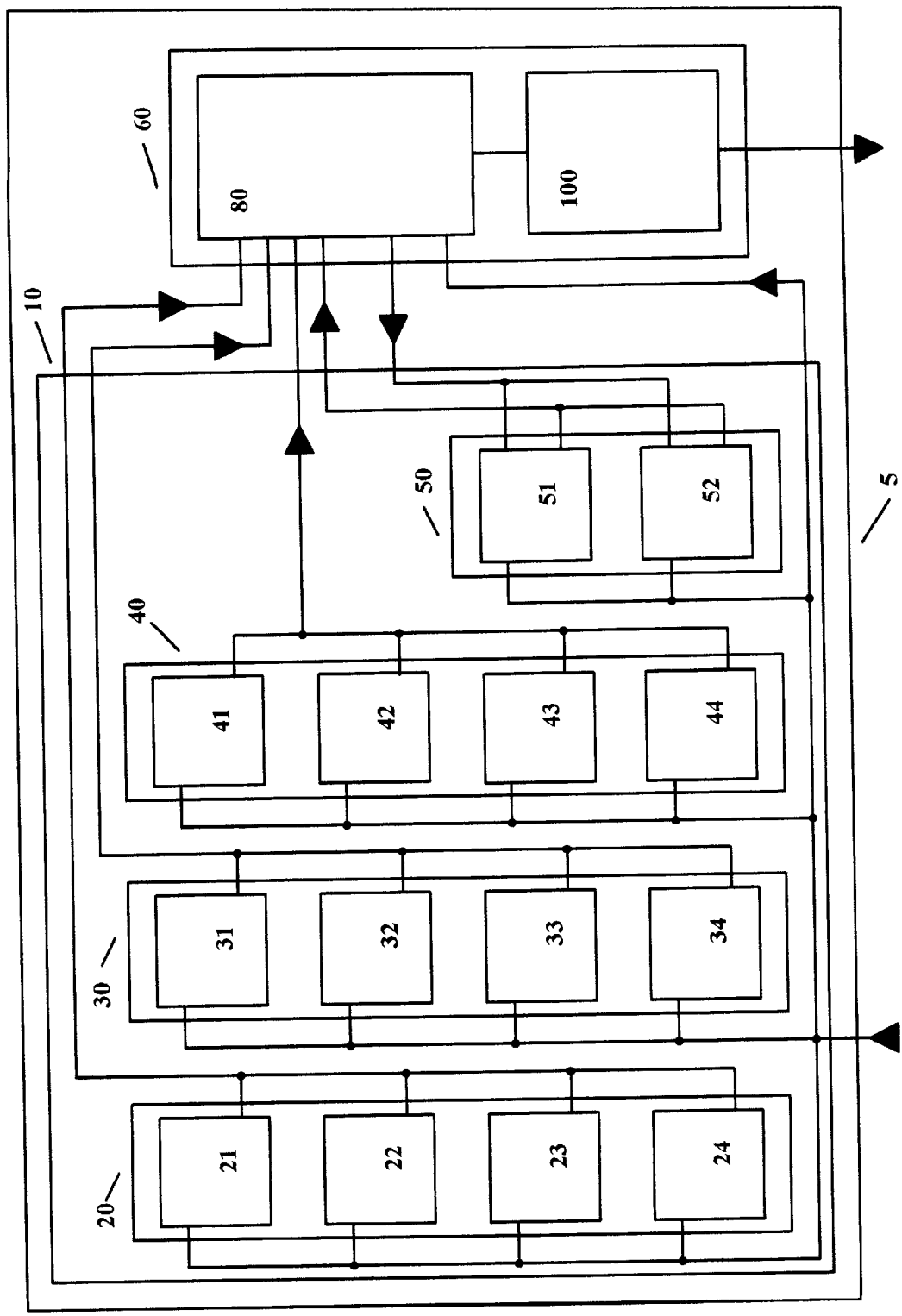
Figure 5:
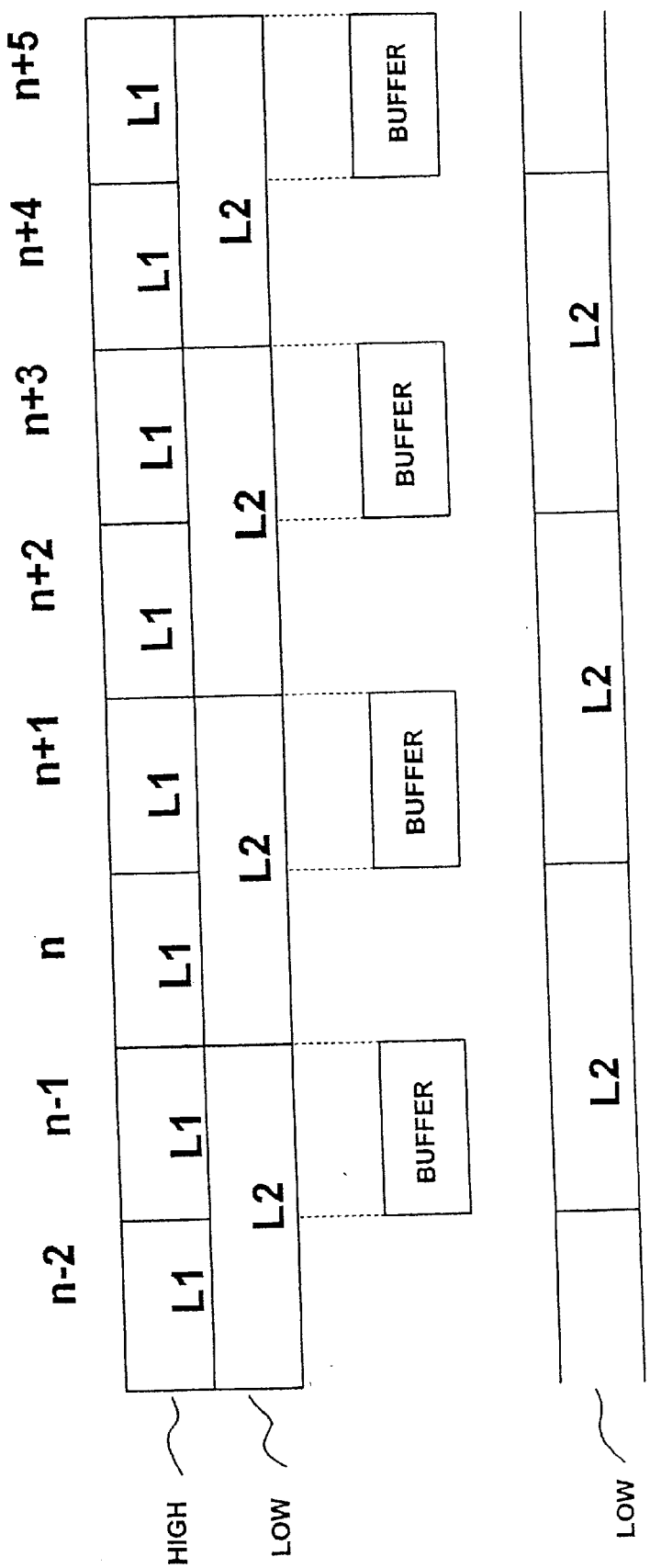
Figure 6:
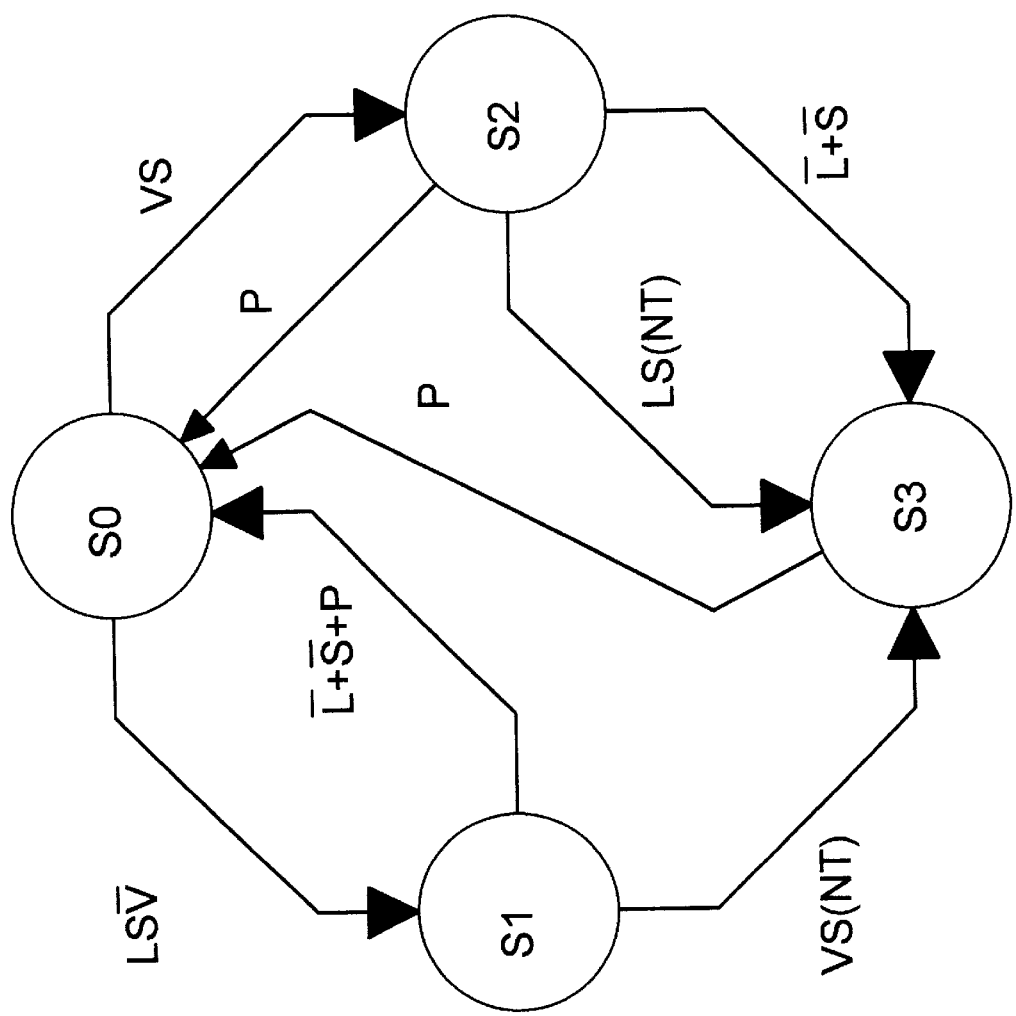
Figure 7A:
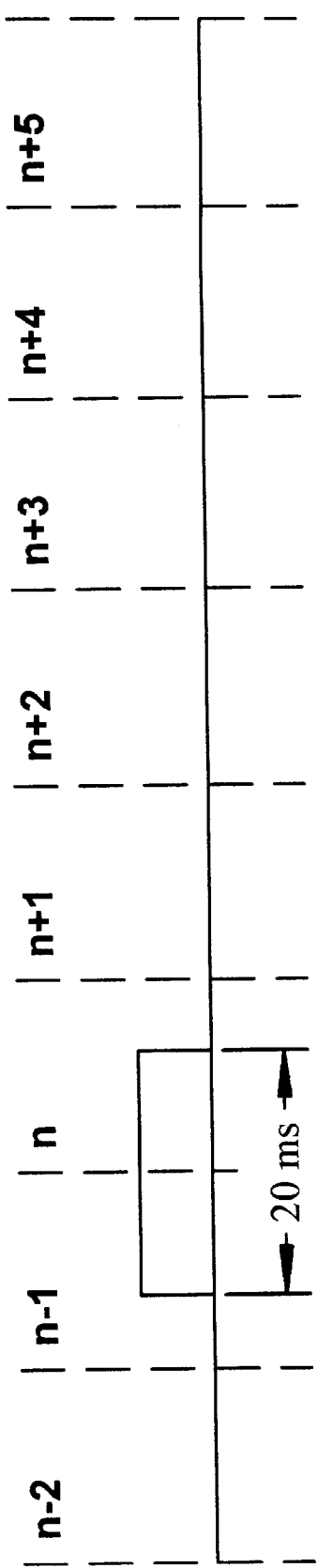
Figure 7B:
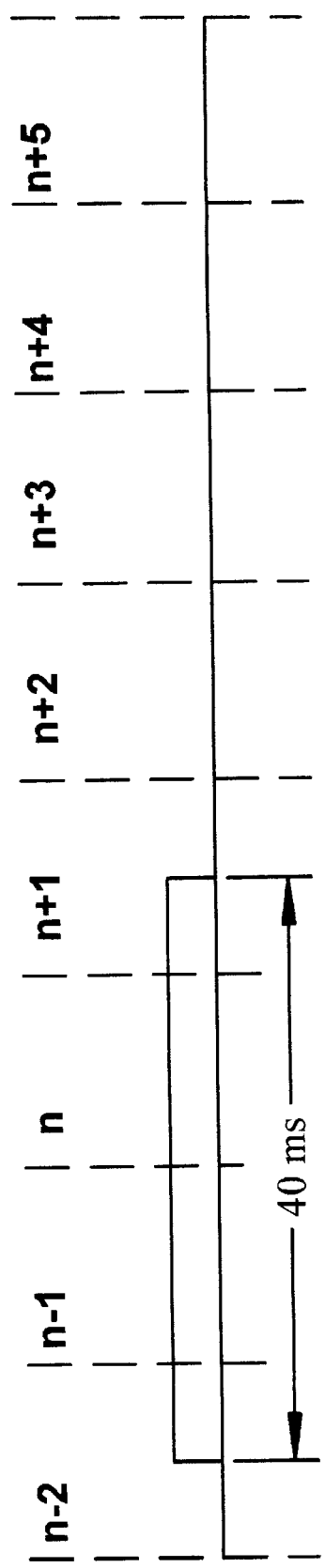
Figure 8A:
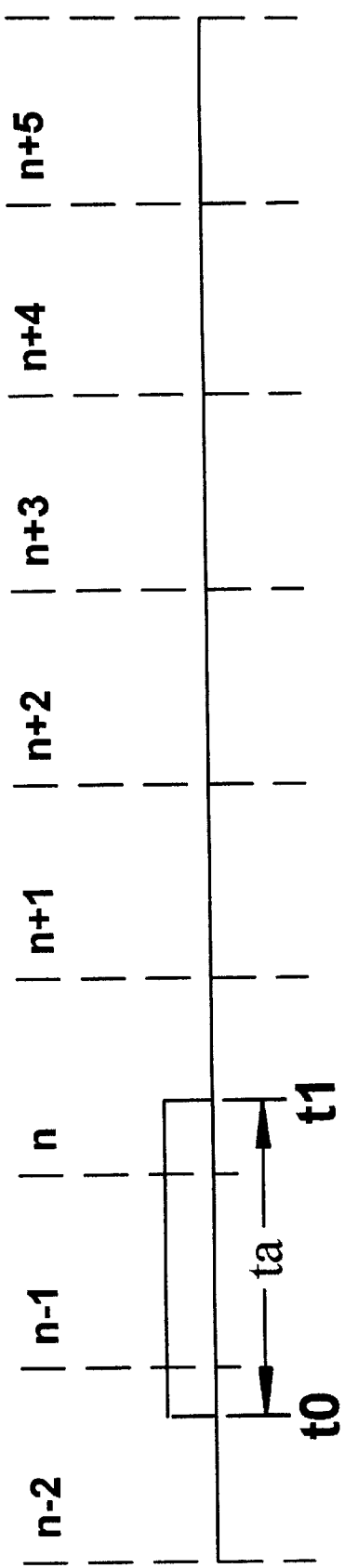
Figure 8B:
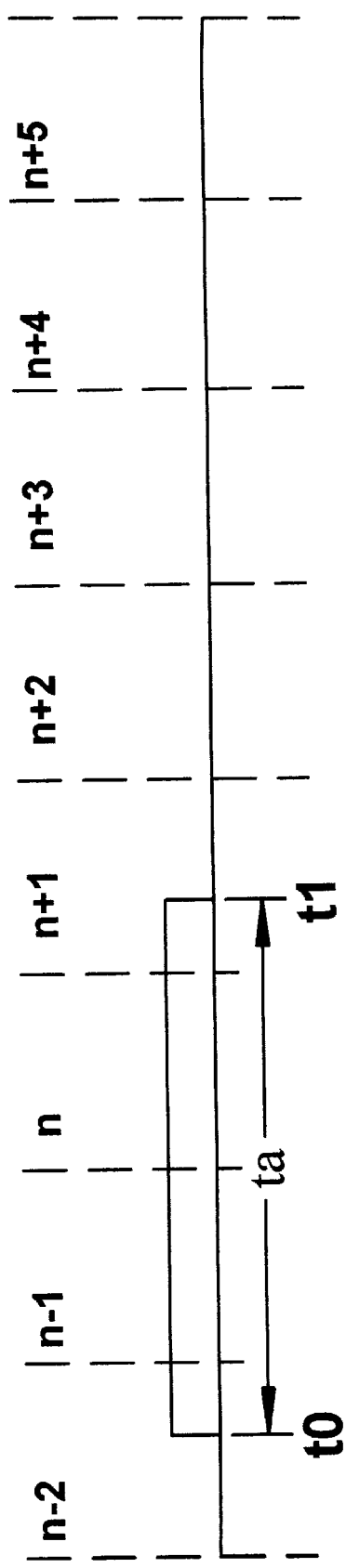
Figure 8C:
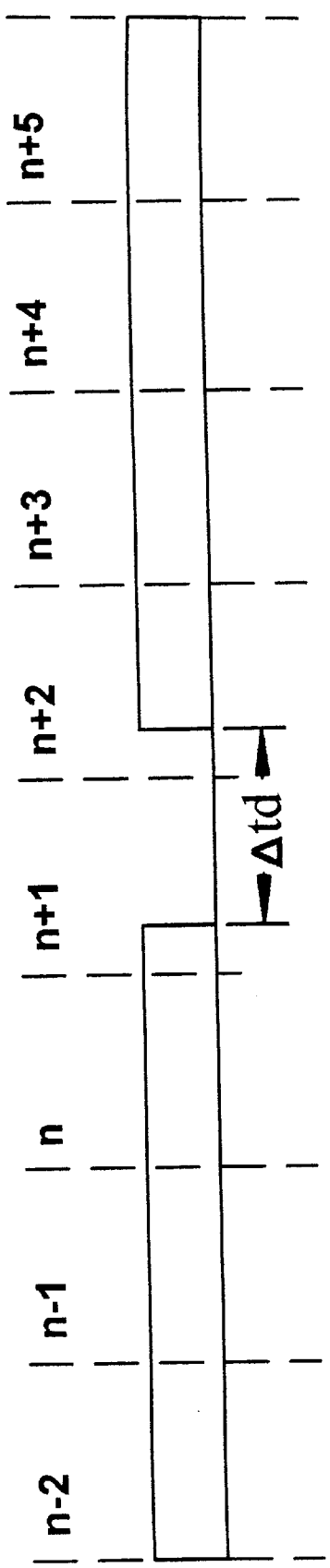
Figure 8D:
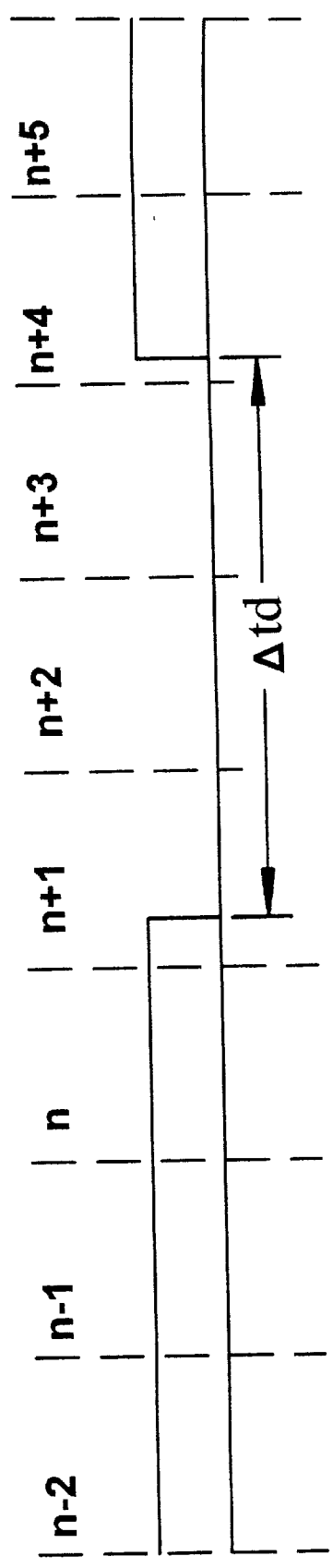

Table 3 is a table of ratios for the total power test;

Table 4 is a second table of ratios for the total power test;

FIG. 1 is an illustration of the symbols encoded by the 8 DTMF signal tones;

FIG. 2 is graph of the Fourier transform of a rectangular window function;

FIG. 3 is a block diagram of a preferred embodiment of the present invention;

Figure 4:
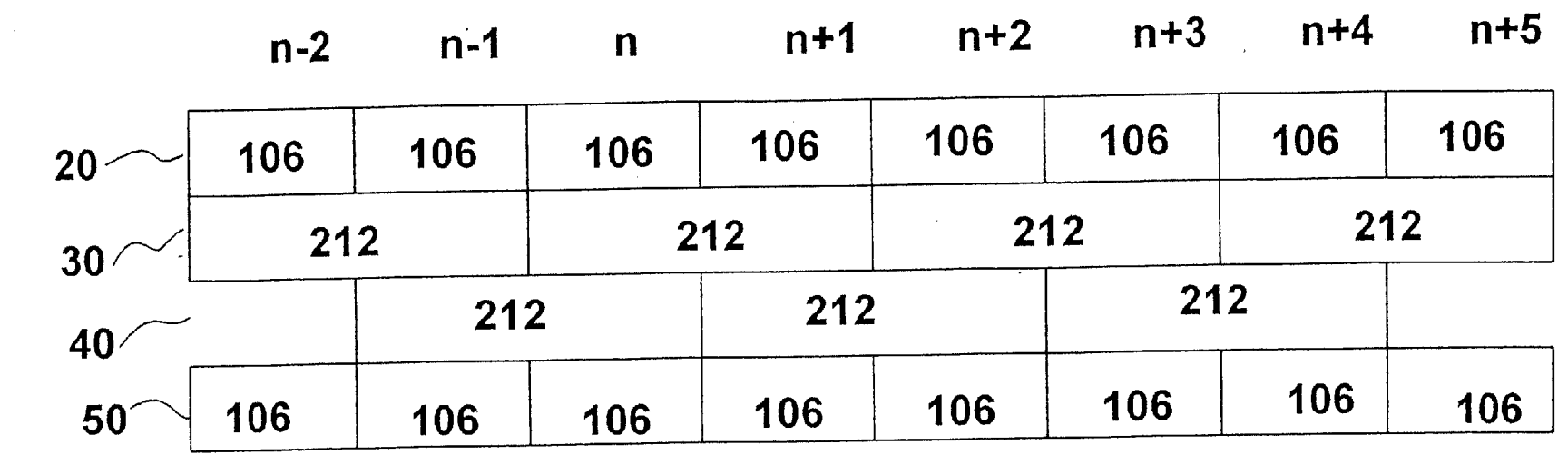

FIG. 4 is a timing representation of high and low band frames for a preferred embodiment;

FIG. 5 is an illustrative timing representation for frames of unequal length;

FIG. 6 is a flow graph representation of a finite state machine of a preferred embodiment of the present invention;

FIG. 7a is a timing representation of a 20 msec signal;

FIG. 7b is a timing representation of a 40 msec signal;

FIG. 8a is a timing representation of a signal that is greater than one frame but less than three frames;

FIG. 8b is a timing representation of a signal that is greater than two frames but less than four frames;

FIG. 8c is a timing representation of an interdigit time between valid tones that is less than two frames; and FIG. 8d is a timing representation of an interdigit time between valid tones that is greater than two frames.

DETAILED DESCRIPTION OF THE PREFERRED EMBODIMENTS

A block diagram of a preferred embodiment of the present invention is shown in FIG. 3. The system 5, comprises a filter bank 10 and post processor 60. Filter bank 10 comprises a high band filter block 20, a first low band filter block 30, a second low band filter block 40, and a harmonic filter block 50. High Band Filter Block 20 comprises four high band modified NDFT Goertzel filters 21, 22, 23 and 24. Each of high band filters 21, 22, 23 and 24 detect signal power over concurrent frames of 106 samples. Filter 21 detects signal power at about 1209 Hz. Filter 22 detects signal power at about 1336 Hz. Filter 23 detects signal power at about 1477 Hz. Filter 24 detects signal power at about 1633 Hz. First Low Band Filter Block 30 comprises four low band modified NDFT Goertzel filters 31, 32, 33 and 34. Each of low band filters 31, 32, 33 and 34 detect signal power over concurrent frames of 212 samples. Second Low Band Filter Block 40 comprises four low band modified NDFT Goertzel filters 41, 42, 43 and 44. Each of low band filters 41, 42, 43 and 44 detect signal power over concurrent frames of 212 samples. Filters 31 and 41 detect signal power at about 697 Hz. Filters 32 and 42 detect signal power at about 770 Hz. Filters 33 and 43 detect signal power at about 852 Hz. Filters 34 and 44 detect signal power at about 941 Hz. Harmonic filter block 50 comprises two modified NDFT Goertzel filters 51 and 52. Each of filters 51 and 52 detect signal power over concurrent frames of 106 samples. Filter 51 detects signal power at about the first harmonic of a low band DTMF frequency. Filter 52 detects signal power at about the first harmonic of a high band DTMF frequency. As will be discussed, only the signal power in the first harmonics of the two valid DTMF tones that are detected in the previous frame will be computed in the current frame. Thus, a total of 14 NDFT modified Goertzel filters are implemented in the preferred embodiment. The degree to which the filters of filter bank 10 are centered at the DTMF frequencies and their harmonics will depend upon the precision of the machine used to implement system 5. Further, it will be understood that while the Goertzel filter structure is used to implement the filters of filter bank 10, a person of ordinary skill in the art would recognize other filter structures that could be implemented instead. The filter structure chosen will determine the computational efficiency, frequency and time characteristics of system 5.

The outputs of filter bank 10 are input to post processor 60, which may be divided into two functional blocks: a signal analyzer, 80, and a finite state machine 100. Signal analyzer 80 primarily performs power level checks, to determine if the received signal meets the ITU power constraints. Finite state machine 100 primarily determines whether the signal meets ITU timing constraints. The preferred embodiment of FIG. 3 may be implemented in a fixed point digital signal processing integrated circuit such as, for example, the Motorola 56000 or the Texas Instruments TMS320C50, for DTMF detection of 24 channels of a $T_1$ line. It will be understood that the precise frequency and time characteristics of system 5 will vary with the precision of the machine chosen for implementation.

The frames of filter blocks 20, 30, 40 and 50 are temporally aligned as shown in FIG. 4. The 212-sample frames of first low band filter block 30 are offset by 106 samples from the 212-sample frames of second low band filter block 40. Since the 212-sample frames of first and second low band filter blocks 30 and 40 are offset by 106 samples, the output of these filter blocks will occur alternately. The frames are also aligned such that the outputs from low band filter blocks 30 and 40 are produced concurrently with the outputs from high band filter block 20. That is, at the end of a 106-sample period, an output will be produced by filter block 20 and filter block 30, but filter block 40 will continue to accumulate samples. At the end of the next 106-sample period an output will be produced by filter blocks 20 and 40, but filter block 30 will continue to accumulate samples. Therefore, at the end of every high band frame, high band and low band results will be obtained concurrently. The frames of harmonic filter block 50 are aligned to produce results concurrently with the results produced by filter block 20 after every 106 samples.

In a preferred embodiment, a rectangular window frame is employed. For a sequence (frame) of 106 samples, computer simulations show that the worst-case sidelobe is 13 dB down from the mainlobe. Although tapered windows may reduce the sidelobes, implementation of tapered windows increases computational complexity and decreases frequency resolution of the NDFT Goertzel filters. The increase in mainlobe width caused by tapered windows necessitates an undesirable increase in the window size to achieve the same selectivity of a rectangular window. Although the sidelobes associated with the rectangular window are a significant source of error in the determination of DTMF signal power, they do not prevent the present invention from conforming to all ITU specifications. Consequently, a rectangular window is preferred to obtain the narrowest main lobe with minimal computational complexity. Nevertheless, it will be understood by persons of ordinary skill in the art that tapered windows can be used in accordance with the principles of the present invention without departing from them.

At a sampling frequency of 8 kHz, a 106-sample frame corresponds to a 13.3 msec window. This guarantees that a 40 msec DTMF tone would fill at least two complete frames. Unfortunately, this frame size does not meet the ITU frequency resolution specifications for all frequencies. Specifically, the detector is unable to reject frequencies in the low-group that lie outside the +/−3.5% band centered at the low band DTMF tones. A larger frame size is necessary to meet the frequency specifications for these low band tones. However, increasing the frame size increases the difficulty of meeting the ITU timing specifications. Also, a larger frame size increases the selectivity of the filter, making it more likely that frequencies within +/−1.5% of high band DTMF frequencies will be erroneously rejected.

Table 2 illustrates the tradeoffs for selecting the frame size. The data in Table 2 was generated from MATLAB® simulations, although a person of ordinary skill in the art could readily develop software or select alternative commercially available software to derive this data. Each table entry is the ratio of the energy at the nominal DTMF frequency to the energy at the frequency with the given percent deviation from the nominal value, for the given rectangular frame length. The ITU specifications require acceptance of frequency error of 1.5% or less, and rejection of frequency error of 3.5% or greater. Therefore, a low ratio in the 1.5% columns and a high ratio in the 3.5% columns is desired. A ratio of two or less was selected as a measure for acceptance and a ratio of three or greater was selected as a measure for rejection. Unacceptable values are indicated in Table 2 by "strike-throughs." Table 2 shows that a 106-sample frame satisfies the frequency constraints for each high band frequency, but fails as to each low band frequency. Similarly, a 212-sample frame satisfies the frequency constraints for each low band frequency, but fails as to each high band frequency. A frame size of 165 samples comes the closest to meeting both the high group and low group frequency specifications, but it still fails to meet both the 3.5 percent specification for 697 Hz and the 1.5 percent specification for 1633 Hz. Since no single frame size meets both the high group and low group frequency specifications, a different frame size should be chosen for each group. In a preferred embodiment, therefore, a frame of 212 samples is used for the low-group frequencies and a frame of 106 samples is used for the high group frequencies as already described. It will be understood by persons of ordinary skill in the art that frame lengths other than 106 and 212 samples may be implemented that will achieve the ITU frequency selectivity and timing constraints.

Use of two different frame lengths to conform to the ITU specifications requires proper implementation of NDFT filters operating over different frame lengths. A filter operating over a smaller frame length will produce a DFT output more frequently than a filter operating over a longer frame length. Referring to FIG. 5, consider a frame length of $L_1$ for the high band frequencies and a frame length of $L_2$ for the low band frequencies. Most conveniently, $L_2$ is chosen to be an integer multiple of $L_1$. In particular, $L_2$ is chosen equal to $2 \times L_1$. The difference in frame lengths of the high and low band frames is then $L_1$ samples. To achieve concurrent results for the high and low band frames, the results of the NDFT at low band frequencies over the previous frame of $L_2$ samples could be compared to the results of the NDFT at high band frequencies over the previous two frames of $L_1$ samples each, subject to appropriate normalization. By storing $L_1$ samples in a buffer, a low band result of an NDFT filter operating over the previous $L_2$ samples can be produced every $L_1$ samples concurrently with each high band filter result. But this would require considerable data storage space, especially for multi-channel DTMF systems. The preferred method provided by the present invention is to utilize two low band filters each of length $L_2$ staggered by $L_1$ samples for each low band DTMF frequency and one high band filter of length $L_1$ for each high band DTMF frequency. This is illustrated in FIG. 4 with $L_2 = 212$ and $L_1 = 106$. By selecting the low band frame length $L_1$ equal to twice the high band frame length $L_1$ and staggering the two low band frames by an amount equal to the high band frame length $L_1$, a low band result will be produced every $L_1$ samples concurrently with each high band result. In this way, the ITU frequency and timing constraints can be achieved without signal buffering.

The outputs of filter blocks 20, 30 and 40 are input to signal analyzer 80. Signal analyzer 80 performs a series of signal level checks to determine if the output of filter blocks 20, 30 and 40 indicate the possible presence of a valid DTMF signal. Each filter of filter blocks 20, 30, 40 and 50, compute an unnormalized DFT. For a constant input signal of equal power at each DTMF tone, the unnormalized 212-sample frames would result in power levels that are four times greater than the power computed over the unnormalized 106-sample frames because there are twice as many samples accumulated in the longer frames. To normalize the results of the filters operating over different frame lengths, the power output from the filters operating over 106 samples is multiplied by 4. After every 106 samples, signal analyzer 80 determines the power, $P_1$, of the tone at the high band DTMF frequency, $f_1$, that has the strongest power level of any high band DTMF tone over the previous 106 samples. After every 106 samples, signal analyzer 80 also determines the power, $P_2$, of the tone at the low band DTMF frequency, $f_2$, that has the strongest power level of any low band DTMF tone over the previous 212 samples. A static threshold test is implemented by requiring the strongest DTMF tones in each band to exceed a power level that ensures detection of DTMF tones down to −33 dBm of attenuation, which exceeds the Bellcore standard of −25 dBm, and is within the precision of commercially available digital signal processors. (Minus one dBm represents one deciBel of attenuation in power from a level of 1 milli-Watt.) A dynamic thresholding test is also implemented. For dynamic thresholding, the power level, $P_1$, is required to be ten times greater than the power of any other DTMF tone in the high band. The power level, $P_2$, is required to be ten times greater than the power of any other DTMF tone in the low band. Persons of ordinary skill in the art will recognize that other threshold values for static and dynamic thresholding can be used. Preferably, suitable thresholds to achieve desired system performance are determined computationally by computer simulation and evaluation of system performance in response to generated signals containing valid and invalid DTMF tones. Such simulation techniques are within the skill of persons of ordinary skill in the art. Application of such techniques have resulted in a range of suitable dynamic thresholds for a preferred embodiment of about four to nineteen.

Signal analyzer 80 compares the energy of the strongest normalized DTMF tone in the low band to the energy of the strongest normalized DTMF tone in the high band to determine if the signal satisfies the ITU twist constraint. To compare normalized power levels produced by filters operating over different frame lengths, the high band DTMF power levels of the previous two 106-sample frames are averaged and compared to the low band DTMF power level of the corresponding 212-sample frame. Ideally, DTMF signals within the twist range of −4 dB to +8 dB will be accepted. However, due to signal processing errors such as windowing, and round-off, the actual twist values resulting in acceptance will deviate from the ideal. In a preferred implementation, the acceptable twist was confined to the range of the high frequency power being less than 2.8 times higher than the low frequency power for reverse twist and the low frequency power being less than 7 times higher than the high frequency power for forward twist. This resulted in 100 percent detection of tones with reverse twist of greater than −4.3 dB, with a minimum accepted reverse twist of −4.7 dB. The forward twist results were 100 percent detection of tones with forward twist less than 8.3 dB, with a maximum accepted forward twist of 8.9 dB. Therefore, the present invention meets the ITU twist constraints. Persons of ordinary skill in the art will understand that these results will vary with the characteristics of the particular signal processor implementation of the present invention. A person of ordinary skill in the art can readily simulate system performance in response to generated DTMF signals to determine optimal achievable twist thresholds for a given system implementation.

Signal analyzer 80 also performs a total power test. The total power test is a comparison of the total power in the received signal to the sum of the power of the strongest low band DTMF tone and strongest high band DTMF tone. The received signal is input into signal analyzer 80, which computes the total power in the received signal over the previous two frames of 106 samples. That is, $X_n = X_{n-1} + x^2_n$, $n = 1, 2, 3 \ldots$, where $X_n$ is the total power of the previous n samples, and $x_n$ is the energy of the most recent sample. Also, the high frequency DTMF power detected in the previous two 106-sample frames are averaged and added to the low band DTMF power detected over the previous 212 sample frame. This test is performed after every 106 samples. A decision is made that the received signal is not a valid DTMF symbol if the following total power expression is true:

$$\frac{(H_{p1} + H_{p2})/2 + L_p}{(T_1 + T_2)} < R \tag{2}$$

where, $T_1 + T_2$ = the total signal power received in the previous 212 samples, $(H_{p1} + H_{p2})$ = the total power of the strongest high band DTMF tone in the previous two 106-sample frames, $L_p$ = the total power of the strongest low band DTMF tone in the previous 212-sample frame; and R=a variable ratio, dependent upon the symbol being decoded.

The variable ratio, R, is set so as to result in failure of the total power test if sufficient signal power lies outside 1.5% of the nominal DTMF frequencies. The value of R can be determined experimentally for each DTMF symbol. Specifically, suppose that a signal is received with a low band tone $f_a$ and a high band tone $f_b$, and suppose that either or both of $f_a$ and $f_b$ deviate from the nearest nominal DTMF frequency by ±3.5%. Because of the tonal spread of energy caused by the finite frame lengths, some energy of the tones centered at $f_a$ and $f_b$ will be spread and will be detected by filters centered at the nearest nominal DTMF frequencies. The ratio of the sum of the power detected at the nominal DTMF frequencies that is caused by spreading of the energy of tones offset from the nominal DTMF frequencies by ±3.5% to the total power of these offset tones establishes the value of R which must be exceeded for detection of a valid DTMF tone. This value of R can be determined experimentally for each DTMF symbol by simulating a dual tone signal with one of the two simulated tones offset by ±3.5% from the nominal DTMF frequency for that symbol, and the other tone centered at the nominal DTMF frequency for that symbol. With the detector filters of filter banks 20, 30 and 40 centered at the nominal DTMF frequencies, the simulated dual tone signal is input to system 5 and the value of the ratio on the left-hand side of equation (2) is computed. The value of R that results will depend on which of the two simulated tones was centered at the nominal DTMF tone and which was caused to deviate from the nominal tone by ±3.5%. Which of these alternative simulated signals will produce the larger value of the ratio must be determined by simulating each alternative signal for each symbol. This is so because, whereas the longer frame of the low band produces a narrower main beam and narrower sidelobes, resulting in less tonal spreading than would be caused by the shorter frame of the high band, a deviation of ±3.5% of a low band frequency corresponds to a smaller absolute offset in frequency than a deviation of ±3.5% of a high band frequency. Although a formulaic method may exist for determining which of the alternative simulated signals will result in the larger value of the ratio for a given symbol, the preferred method for determining the larger value of the ratio is to simulate each of the alternative signals. The larger value establishes the threshold ratio of the sum of the power of the strongest high and low band signals at the nominal DTMF frequencies to the total power of the received signal which, if not exceeded, must result in rejection. The values of R for each symbol, determined by performing the described simulations, are shown in Table 3. The values of R shown in Table 3 are about the lowest values of R that will ensure rejection when either high or low band of the DTMF signal deviates from its nominal value by more than 3.5%. If the values of R were set much lower, then acceptance might occur for symbols that exceed the 3.5% criterion. Values of R may also be determined that will ensure acceptance when the high band tone and low band tone both deviate by 1.5% of their nominal values. This can be accomplished by simulating the dual tone pairs for each symbol with both tones offset by ±1.5% from their nominal values, and then choosing the lowest resulting value of R as the threshold ratio which, if exceeded, will result in acceptance if the tone otherwise meets ITU specifications. These values of R, shown in FIG. 4, are about the highest values of R that will ensure acceptance when the high and low band tones both deviate by ±1.5% of their nominal values. If the values of R were set much higher, then rejection might occur for valid symbols within the 1.5% criterion. Persons of ordinary skill in the art will recognize that these values depend upon machine precision, frame length and other parameters. Note, that if a received dual tone signal corresponding to any one of the DTMF symbols whose nominal low band frequency is 770 Hz, 852 Hz, or 941 Hz, has a low band tone that deviates from the nominal frequency by more than 3.5%, the signal will probably fail the reverse twist test because the low band tonal energy of the received signal that is detected at the nominal low band DTMF frequency will probably be too low for the twist to be greater than −4 dB. Thus, the reverse twist test provides an additional guard against excess frequency deviation of the low band tone for these symbols.

To verify the frequency response achieved with the tests implemented by signal analyzer 80, system 5 can be tested with a statistically large ensemble of simulated dual-tone input signals of various randomly selected durations satisfying the ITU timing constraints, whose low and high band tones deviate from the nominal DTMF frequencies. Implementation of the tests performed by signal analyzer 80 results in 100% rejection of signals whose low or high band tone deviates by more than +/−3.5% from the nominal DTMF frequencies. Acceptance performance for symbols whose high and low tones both deviated by up to +/−1.5% from nominal DTMF frequencies was 100%, except for the symbol "*", corresponding to the dual tone pair (941 Hz, 1209 Hz). Note that for this symbol, the highest value of R that ensures acceptance of the symbol when both high and low band tones deviate by 1.5% is too low to ensure rejection of the symbol when either high or low band tone deviates by more than 3.5%. Likewise, the lowest value of R for this symbol that ensures rejection for frequency deviation of more than 3.5% is too high to ensure acceptance when both high and low band frequencies deviate by a full 1.5%. However, by choosing the higher value of R for this symbol, as given in Table 3, 100% acceptance of symbols occurred when the maximum deviation of both tones was +/−1.40% or less. No prior art detectors achieve this performance. The ITU requires detectors to accept 1.5% frequency errors. Providers of prior art detectors have interpreted the standard to require acceptance when either one, but not both, of the two DTMF frequencies representing the symbol have 1.5% deviation. The present invention exceeds the performance of prior art detectors and exceeds the requirements of the ITU under this interpretation for all 16 symbols, and exceeds the ITU requirements for 15 out of 16 symbols if interpreted to require acceptance if both frequencies deviate by a full +/−1.5%.

Signal analyzer 80 also discriminates against voice-simulated symbols. The harmonic frequencies at which harmonic filters 51 and 52 compute the NDFT is controlled by signal analyzer 80. Harmonic filter 51 is caused by signal analyzer 80 to produce the NDFT of the signal in the current 106 sample frame at the first harmonic frequency of the strongest DTMF low band tone that was received during the previous 212-sample frame. Similarly, harmonic filter 52 is caused by signal analyzer 80 to produce the NDFT of the signal in the current 106-sample frame at the first harmonic frequency of the strongest high band DTMF tone that was received during the previous 106-sample frame. The power present in the harmonics is then compared by signal analyzer 80 to a threshold value to determine if sufficient harmonic energy exists to make a decision that symbol simulation has occurred, rather than transmission of a valid DTMF signal. By analyzing in the current frame only the harmonics of the dominant DTMF tones at $f_1$ and $f_2$, found in the prior frame, discrimination of voice-simulated tones can be achieved with only two additional NDFT filters.

Discrimination against voice simulation of symbols can be achieved by requiring the ratio of the power of the fundamental DTMF tone to the power of its first harmonic, the fundamental-to-harmonic ratio, to exceed a certain threshold (referred to herein as the harmonic ratio test). If the threshold is set too low, invalid tones may be accepted. If the threshold is set too high, valid tones may be rejected. The first harmonics of the nominal DTMF frequencies are shown in Table 1. Note that the first harmonics of the lowest three low band frequencies are very close to three of the high band DTMF frequencies. Specifically, for the symbols "2," "6," and "C," corresponding to the tonal pairs (697 Hz, 1336 Hz), (770 Hz, 1477 Hz) and (852 Hz, 1633 Hz), respectively, the spread of tonal energy caused by the finite frame lengths of harmonic filter 51 and high band filters 21, 22 or 23 cause tonal energy of the harmonic of the low band frequency to overlap the tonal energy of the high band frequency. This overlap becomes more pronounced for a valid DTMF signal with a high band tone that deviates by +1.5% from its nominal frequency. For example, the harmonic of the low band tone of the symbol "2" is at 1394 Hz. If the high band tone for this symbol deviates from the nominal frequency by +1.5%, which is within the ITU constraints for a valid symbol, the high band tone will be at about 1356 Hz. This is only about 38 Hz away from the harmonic of the low band tone. When this occurs, enough tonal energy from the high band tone will be spread toward the harmonic of the low band tone that an erroneous rejection will occur, unless the threshold is set very low. But setting the threshold low enough to avoid rejection of valid tones may result in acceptance of invalid tones. Experimentally, it was determined that to avoid erroneous rejection of valid tones caused by the spread of the high band tonal energy into the second harmonic of the low band tone, the threshold had to be set so low that 100% rejection of signals occurred only when the fundamental-to-harmonic ratio was less than about 3 dB. But this level of rejection is no better than what can be achieved by applying the total power check.

Therefore, the harmonic ratio test is not performed on the harmonics of the low band DTMF tone for these three symbols. However, for the harmonics of the high band tones for these three symbols and for the harmonics of both tones of the remaining 13 DTMF symbols, the harmonic ratio test can be applied with a ratio high enough to achieve significant rejection of voice-simulated tones. For the thirteen symbols to which the harmonic ratio test is applied to both harmonics, a threshold ratio of 12.5, corresponding to about 11 dB, was experimentally determined to achieve 100% rejection of signals with a fundamental-to-harmonic ratio of about 9 dB or less, and 100% acceptance of signals with a fundamental-to-harmonic ratio of about 13 dB or greater. The harmonic ratio test applied to the high band frequencies of the symbols "2," "6," and "C," with a threshold ratio of 12.5, results in 100% rejection of signals that have a fundamental-to-harmonic ratio of about 7 dB or less, and 100% acceptance of signals whose fundamental-to-harmonic ratio is about 11 dB or greater. These levels of rejection for speech simulation of these three symbols have not been achieved in the prior art. Prior art detectors either did not use a harmonic check, or allowed these symbols to be erroneously rejected, or set the threshold so low that the harmonic ratio test did no better at rejecting speech simulation than the total power check. Note that the total power check alone may meet Bellcore and ITU requirements. Thus, the harmonic ratio test might be eliminated to reduce computational complexity. However, the ratio test as implemented herein provides substantially improved speech simulation rejection over prior art methods. It should be noted also that the threshold ratio can be raised to a value of higher than 12.5 to achieve greater rejection. Tests performed indicate that the ratio can be raised to as high as 19 without incurring rejection of valid tones. That system 5 provides superior rejection of voice-simulated signals can be verified by observing system response to the Bellcore Series 1 Digit Simulation Test Tapes for DTMF Receivers (sometimes referred to as the Bellcore "Talk-Off" tests.) These tapes consist of six half-hour sequences of speech samples which are known to contain energy at or near valid DTMF frequency-pairs and are used in the art as a standard test source for measuring the speech-rejection capabilities of DTMF receivers in telecommunication systems. These tapes may be obtained from Bellcore. The total number of symbol simulations detected as valid DTMF symbols in response to the content of the Bellcore test tapes should not exceed the limits recommended by Bellcore. The performance of the preferred embodiment of system 5 in comparison to the Bellcore recommendations was determined to be as follows:

| Digits | Maximum Allowed Detections | System 5 Detections |
| --- | --- | --- |
| 0–9 | 333 | 131 |
| 0–9, *, # | 500 | 141 |
| All symbols | 666 | 155 |

Thus, the present invention provides excellent rejection of speech simulated symbols, that well exceeds the Bellcore recommendations.

To determine if the received signal satisfies the ITU timing constraints, a preferred embodiment of the present invention comprises Finite State Machine (FSM) 100. A flow graph of FSM 100 is shown in FIG. 6. The state of FSM 100 is controlled by four Boolean variables determined after each 106-sample frame. These variables are VALID, SAME, LENGTH and PAUSE.

VALID is true if all the following events have occurred:

Event 1. The high band DTMF tones in the last two 106-sample frames have passed the static and dynamic threshold tests.

Event 2. The low band DTMF tone in the last 212-sample frame has passed the static and dynamic threshold tests.

Event 3. The received signal passes the total power test.

Event 4. The signal in the previous frame passes the harmonic ratio test. In an alternative embodiment, the condition of passing the harmonic ratio test could be imposed for the last two frames.

Event 5. The signal passes the twist test.

SAME is true if the symbol detected in the current frame is the same as the symbol detected in the previous frame.

LENGTH is true if the ratio of the high band DTMF tonal power in the two most recent frames is not less than a specified threshold, $P_L$. That is, LENGTH is true if:

$$\frac{P_a}{P_b} \geq P_L$$

where $P_b$ is the larger high band DTMF tonal power in the two most recent frames and $P_a$ is the smaller high band DTMF tonal power in the two most recent frames.

PAUSE is true if the ratio of the sum of the high and low DTMF tonal powers to the total power in the received signal is less than a specified pause threshold, T. That is, PAUSE is true if:

$$\frac{(H_{P1} + H_{P2})/2 + L_P}{(T_1 + T_2)} < T \quad (3)$$

where the symbols on the left side of the inequality are as defined for the corresponding symbols of equation (2). The pause threshold is determined experimentally to detect whether the interdigit time between two successive symbols not greater than 10 msec or at least 40 msec, as will be explained subsequently herein.

FSM 100 is structured to solve the problem that within a single frame, the detector cannot distinguish between a strong signal of short duration that is equal in power to a weaker signal of longer duration. Consider, for example, a strong 20 msec DTMF signal that overlaps two 106-sample frames, as shown in FIG. 7a, in comparison to a weak 40 msec DTMF signal that overlaps four frames, as shown in FIG. 7b. For ease of reference, the high band frames are labelled sequentially by the integer index, n. If the detector is sensitive enough to detect the presence of the weak 40 msec signal of FIG. 7b in each of the frames n and n−1, the detector will also be sensitive enough to detect the presence of the stronger 20 msec signal of FIG. 7a in the two frames during which it is present. If the 20 msec signal of FIG. 7a satisfies all of the conditions of Events 1 through 5, then at the conclusion of the nth frame the variable VALID will change from False to True. Also, if the symbol decoded in frame n−1 is the same as the symbol decoded in the nth frame, the variable SAME will be True. If the conditions required for VALID and SAME to be true were the only conditions imposed, the detector would erroneously decide that the signal of FIG. 7a is a valid DTMF signal, even though it is less than 23 msec in duration. If the condition were imposed that the received signal must be of sufficient power to pass the static and dynamic threshold tests in each of three successive frames rather than two, then a signal of less than 23 msec could always be rejected. However, if this condition were imposed, a valid-but-weak 40 msec signal would not always be accepted. In particular, suppose that the 40 msec signal of FIG. 7b has just enough power in frames n and n−1 to satisfy the static threshold test in each of these frames. Then neither of the partially filled frames, n−2 and n+1, would contain sufficient power to exceed the static threshold. Thus, there would not be three successive frames of sufficient power and the valid signal would erroneously be rejected.

The problem of consistently rejecting signals of duration 23 msec or less while consistently accepting valid signals of 40 msec duration or longer is one that has not been solved by prior art DTMF detectors. The present invention solves this problem by requiring the variable, LENGTH, to be True at the end of the 106-sample frame preceding or following the frame at which all events 1 through 5 occurred to cause the variable VALID to become true. For VALID to be true, the signal must pass the static threshold test for both of two successive 106-sample frames for the high band tone and for the corresponding 212-sample frame for the low band tone. The signal of shortest duration within a frame that can pass the static threshold test will be the signal with maximum strength at the detector input. Conversely, the weaker the signal, the longer duration it must have within a frame to pass the static threshold test. The weakest signal that will pass the static threshold test will therefore occupy the entire duration of a frame. Setting the static threshold low to detect a weak signal will shorten the minimum duration of the maximum strength signal that will pass the static threshold test. This, in turn, determines the signal of shortest duration that will cause VALID to become true. The static threshold of the preferred embodiment is set so that a signal of −33 dBm will be detected if it occupies the duration of an entire frame. This will result in a maximum strength signal passing the static threshold test if it occupies at least about 45.5% of the duration of a frame.

For LENGTH to be true, the ratio of the high band tonal powers in adjacent frames must be not less than the threshold, $P_L$. The magnitude of $P_L$ determines the maximum difference between the duration of the signal in one frame and the duration of the signal in an adjacent frame that can exist for LENGTH to be true. In a preferred embodiment, $P_L$ is set equal to 0.25. This causes LENGTH to become true only if the power in one frame is not less than one-fourth of the power in the adjacent frame. For a signal of fairly constant amplitude, this corresponds to the duration of the signal in one frame being not less than one-half the duration of the signal in an adjacent frame.

The use of LENGTH in conjunction with VALID ensures that the received DTMF signal must be at least partially present in three 106-sample frames, without requiring that the signal in all three frames pass the static threshold test. This will ensure that a tone of 23 msec or less will always be rejected and a valid tone of at least 40 msec will always be accepted. To demonstrate the operation of FSM 100, its transitions from state to state in response to DTMF input signals of various durations, as shown in FIG. 8, will be explained. It will be assumed that these signals satisfy the conditions for events 3 through 5 to occur at each frame in which the signal is present. Otherwise, the signal would not be valid regardless of its duration. It will further be assumed that if the signal occupies the full duration of a frame it will exceed the static and dynamic threshold test for that frame. Thus, the validity of the received signal will depend solely on its duration, interdigit time, and its strength in partially filled frames. The operation of FSM 100 can be described by a set of time-dependent Boolean state equations that relate the state of the system at the end of a frame, k+1, to the state of the system at the end of the previous frame, k, in terms of the Boolean variables, VALID, SAME, LENGTH, and PAUSE at the end of frame, k+1, as follows:

$$S_{0,k+1} = (\overline{S}_{k+1} + S_{k+1}\overline{V}_{k+1}\overline{L}_{k+1})S_{0,k} + (\overline{L}_{k+1} + \overline{S}_{k+1})S_{1,k} + P_{k+1}(S_{0,k} + S_{1,k} + S_{2,k} + S_{3,k})$$

$$S_{1,k+1} = \overline{P}_{k+1}L_{k+1}S_{k+1}\overline{V}_{k+1}(S_{0,k} + S_{1,k})$$

$$S_{2,k+1} = \overline{P}_{k+1}V_{k+1}S_{k+1}S_{0,k}$$

$$S_{3,k+1} = \overline{P}_{k+1}(\overline{L}_{k+1} + \overline{S}_{k+1})S_{2,k} + \overline{P}_{k+1}S_{3,k}$$

$$S_{3,k+1} = \overline{P}_{k+1}(\overline{L}_{k+1} + \overline{S}_{k+1})S_{2,k} + \overline{P}_{k+1}S_{3,k}$$

$$S_{3,k+1}{}^{NT} = \overline{P}_{k+1}(V_{k+1}S_{k+1}S_{1,k} + L_{k+1}S_{k+1}S_{2,k})$$

where V means VALID=TRUE
$\overline{V}$ means VALID=FALSE
S means SAME=TRUE
$\overline{S}$ means SAME=FALSE
L means LENGTH=TRUE
$\overline{L}$ means LENGTH=FALSE
P means PAUSE=TRUE
$\overline{P}$ means PAUSE=FALSE
and $S_{l,k}$=True only if FSM 100 has transitioned to state $S_l$ at the end of frame k, l=0,1,2,3,4, and is false otherwise;

and $S_{l,k+1}$=True only if at the end of frame k+1, the expression on the righthand side of the equation is true,
and where it will be understood that the "+" symbol connecting the Boolean terms is the logical- "or" operator and multiplication of Boolean variables is the logical- "and" operation; that is, if x and y are Boolean variables then the Boolean operators are x+y="x or y", xy="x and y", and $\bar{x}$="not x".

Note that a new tone is detected only when FSM 100 transitions to state $S_3$ from $S_1$, or from $S_2$ with LS=true. For notational convenience, this is denoted as $S_3^{NT}$, where NT stands for New Tone. It will be understood that $S_3^{NT}$ is not a state that is distinct from state $S_3$. Rather, the symbol $S_3^{NT}$ denotes that FSM 100 indicates that a new DTMF tone has been detected upon transitioning to state $S_3$ by the indicated paths. It will also be understood that once FSM 100 is in state $S_3$, a new tone will not be detected until some time after FSM 100 transitions back to state $S_0$. Thus, the state of FSM 100 can be represented by two binary digits (bits). It will also be noted that for some states the PAUSE test will be redundant but is included to reduce computations. Only when FSM 100 transitions to state S3 does PAUSE become relevant to discriminate interdigit times. Thus, to simplify the analysis of FSM 100 in response to the various input signals depicted in FIGS. 8a through 8d, PAUSE will be assumed to be false unless the system has transitioned to state $S_3$. Also, a new tone will never be detected unless SAME becomes true, and a new tone will be detected only if SAME remains true for at least two successive frames. If SAME does not remain true for at least two successive frames the system 5 may reject the signal, and still conform to ITU standards, because the signal did not remain the same for more than 23 msec. Once a new tone is detected however, and FSM 100 transitions to state $S_3$, SAME becomes irrelevant, because FSM 100 can remain in state S3 for so long as the interdigit time is less than 40 msec and still conform to ITU standards. If the interdigit time is at least 40 msec, then PAUSE must become true, causing FSM 100 to transition from state $S_3$ to state So where SAME again becomes relevant. Thus, to simplify the analysis even further it will be assumed that SAME remains true.

By analyzing the response of FSM 100 in response to the signals shown in FIGS. 8a through 8d, the ability of system 5 to meet the ITU timing constraints will be demonstrated. Until a signal is received, FSM 100 will remain in state $S_0$. Suppose now that the signal of duration $t_a=t_1-t_0$ shown in FIG. 8a is input to system 5. The signal duration $t_a$ is greater than 13.3 msec but less than 40 msec. At the end of frame n−2, LENGTH and VALID will each be false regardless of the signal start time $t_0$. Thus, at the end of frame n−2 the system will remain in state $S_0$ At the end of frame, n−1, therefore the state equations are:

$$S_{0,n-1}=\bar{V}_{n-1}\bar{L}_{n-1}$$

$$S_{1,n-1}=L_{n-1}\bar{V}_{n-1}$$

$$S_{2,n-1}=V_{n-1}$$

The state of FSM 100 at the end of frame n−1 will therefore depend upon LENGTH and VALID. With $P_L$ equal to 0.25, LENGTH will be true only if the signal occupies at least 50% of frame n−2. VALID will be true only if the signal in frame n−2 is of sufficient power to exceed the static threshold (because we have assumed that the signal fully occupying frame n−1 passes the static threshold test in that frame). At the end of frame n, the state equations are:

$$S_{0,n}=\bar{V}_n\bar{L}_n S_{0,n-1}+\bar{L}_n S_{1,n-1}$$

$$S_{1,n}=L_n\bar{V}_n(S_{0,n-1}+S_{1,n-1})$$

$$S_{2,n}=V_n S_{0,n-1}$$

$$S_{3,n}=\bar{L}_n S_{2,n-1}$$

$$S_{3,n}^{NT}=V_n S_{1,n-1}+L_n S_{2n-1}$$

Substitution of the expressions for FSM 100 at the end of frame n−1 into the expressions for FSM 100 at the end of frame n yields:

$$S_{0,n}=(\bar{V}_n\bar{L}_n)(\bar{V}_{n-1}\bar{L}_{n-1})+\bar{L}_n(L_{n-1}\bar{V}_{n-1})$$

$$S_{1,n}=L_n\bar{V}_n(\bar{V}_{n-1}\bar{L}_{n-1}+L_{n-1}\bar{V}_{n-1})=L_n\bar{V}_n\bar{V}_{n-1}$$

$$S_{2,n}=V_n\bar{V}_{n-1}\bar{L}_{n-1}$$

$$S_{3,n}=\bar{L}_n V_{n-1}$$

$$S_{3,n}^{NT}=V_n(L_{n-1}\bar{V}_{n-1})+L_n(V_{n-1})$$

At the end of frame n, a new tone will be detected only if $V_n(L_{n-1}\bar{V}_{n-1})$ is true or $L_n V_{n-1}$ is true. The first expression, $V_n(L_{n-1}\bar{V}_{n-1})$, is true only if the signal in frame n−2 occupied at least about 50% of the frame duration and the signal in frame n lasted at least about 45.5% of the frame duration. The second expression, $L_n V_{n-1}$, is true only if the signal in frame n−2 occupied at least about 45.5% of the duration of frame n−2 and the signal frame in n lasted at least about 50% of the frame duration. Thus, the minimum duration signal that will be accepted is not less than (0.455+0.5+1.0)×13.3 msec, which is about 26.0 msec. Therefore, a signal of duration 23 msec or less will be rejected. The signal of minimum duration that will be accepted depends upon the value of $P_L$ If $P_L$ is decreased, the minimum length of a signal that will be accepted will decrease. If $P_L$ is increased, the minimum length of a signal that will be accepted will increase. Similarly, if the static threshold is increased, the minimum duration of a signal that will be accepted will increase. This is so because the minimum duration of a signal of maximum power that will exceed the static threshold w ill increase. If the static threshold is decreased, the minimum duration of a signal that will be accepted will decrease.

Finally, at the end of frame n+1, VALID, and LENGTH will be False. Thus, the state equations now become:

$$S_{0,n+1}=S_{0,n}+S_{1,n}+S_{3,n}$$

$$S_{1,n+1}=False$$

$$S_{2,n+1}=False$$

$$S_{3,n}=S_{2,n-1}+\bar{P}_n S_{3,n-1}$$

Note that if the system has transitioned to state $S_3$, it then becomes relevant to interdigit time discrimination whether PAUSE is true or false. The utility of PAUSE will be discussed in connection with the response of FSM 100 to successive signals separated by an interdigit time as shown in FIGS. 8c and 8d. However for the signal of FIG. 8a presently being discussed, PAUSE will certainly be false by the end of frame n+3, and FSM 100 will be returned to state $S_0$.

Now consider the signal shown in FIG. 8b. This signal has duration $t_a$ that is greater than 26.6 msec and less than 53.2 msec. If the duration $t_a$ is at least 40 msec then the signal must be accepted. That is, the maximum length $t_a$ that results in rejection must be less than 40 msec. At the end of frame n, VALID and LENGTH will be True. PAUSE will be False. The state equations are:

$$S_{2,n} = S_{0,n-1}$$

$$S_{3,n}^{NT} = S_{1,n-1} + S_{2,n-1}$$

At the end of frame n+1 the state equations are:

$$S_{0,n+1} = P_{n+1} S_{3,n}$$

$$S_{3,n+1} = \overline{L}_{n+1} S_{2,n} + \overline{P}_{n+1} S_{3,n}^{NT}$$

$$S_{3,n+1}^{NT} = L_{n+1} S_{2,n}$$

Substitution of the state equations at frame n into the state equations at frame n+1 yields:

$$S_{0,n+1} = P_{n+1}(S_{1,n-1} + S_{2,n-1})$$

$$S_{3,n+1} = \overline{L}_{n+1} S_{0,n-1} + \overline{P}_{n+1}(S_{1,n-1} + S_{2,n-1})^{NT}$$

$$S_{3,n+1}^{NT} = L_{n+1} S_{0,n-1}$$

Substitution of the state equations at n−1 with the states at n−2 yields:

$$S_{0,n+1} = P_{n+1}(L_{n-1} \overline{V}_{n-1} + V_{n-1})$$

$$S_{3,n+1} = \overline{L}_{n+1} \overline{V}_{n-1} \overline{L}_{n-1} + \overline{P}_{n+1}(L_{n-1} \overline{V}_{n-1} + V_{n-1})^{NT}$$

$$S_{3,n+1}^{NT} = L_{n+1} \overline{V}_{n-1} \overline{L}_{n-1}$$

Careful analysis of the equations reveals that the only way that a new tone can be detected by the end of frame n+1 is if one of the following conditions is true:

Condition 1. At the end of frame n−1, LENGTH is true causing FSM 100 to transition to state $S_1$.

Condition 2. At the end of frame n−1, VALID is true, causing FSM 100 to transition to state $S_2$.

Condition 3. Neither of conditions 1 or 2 is satisfied and at the end of frame n+1, LENGTH is true causing FSM 100 to transition from state $S_2$ to state $S_3$.

Condition 1 requires the duration of the signal in frame n−2 to be at least one-half the frame, or 0.5×13.3 msec=6.65 msec. Condition 2 requires the duration of the signal in frame n−2 to be at least 45.5% of the length of the frame, or 0.455×13.3 msec=6.05 msec. Condition 3 can only be true if the duration of the signal in frame n−2 is less than 6.05 msec and the duration of the signal in frame n+1 is at least 6.65 msec. Thus, the maximum length signal that will be rejected must be less than (6.05+13.3+13.3+6.65) msec which is 39.3 msec. Thus, with the static threshold and length threshold, $P_L$, set appropriately, the minimum length tone that is accepted can be set to at least about 26 msec with the maximum length tone that is rejected being less than about 39.3 msec. Implementation of system 5 resulted in the shortest accepted tone being 25 msec at 0 dB attenuation. The longest tone rejected is 39 msec at −28 dBm attenuation. Persons of ordinary skill in the art will recognize that the precise values achieved will depend on the thresholds selected and the precision of the machine used to implement the present invention.

For the signal of FIG. 8b, PAUSE will be certainly be false by the end of frame n+4 and FSM 100 will be returned to state $S_0$. The utility of the PAUSE variable in interdigit time discrimination will now be discussed with reference to the signals shown in FIGS. 8c and 8d. First consider the signal of FIG. 8c, comprising two successive valid DTMF signals each of duration greater than 40 msec separated by interdigit time Δtd. A new tone will be detected by the end of frame n+1. An interdigit time, Δtd, of 10 msec or less must, therefore, not result in a decision that a new symbol has been received. An interdigit time of 40 msec or greater must result in a decision that a new symbol has been received.

At the end of frame n+1, FSM 100 will be in state $S_{3,n+1} = \overline{P}_{n+1} S_{3,n}$, provided that PAUSE is false. PAUSE must be false at the end of frame n+1 if the signal occupies more than 3.333 msec of frame n+1, because then an interdigit time of less than 10 msec cannot have occurred.

As noted, PAUSE is true only if the ratio of the total DTMF tonal power in the previous 212 samples to the total signal power is less than the PAUSE threshold, T. Suppose that at the end of frame n+1, PAUSE is false. At the end of frame n+2, FSM 100 will be in state $S_{3,n+2} = \overline{P}_{n+2} S_{3,n+1}$ only if PAUSE is again false. PAUSE must be false if the signal occupies more than 16.666 msec of the duration of frames n+1 and n+2 combined. Thus, T must be small enough to ensure that PAUSE will be false when a DTMF tone of minimum detectable strength that satisfies the static threshold test occupies more than 16.666 msec of two adjacent frames.

Consider, next, the signal of FIG. 8d, which shows two valid DTMF tones, each of duration greater than 40 msec, separated by an interdigit time, Δtd. If Δtd is 40 msec or greater, then two distinct tones must be detected. This requires that PAUSE must be true at the conclusion of frame n+2 or n+3. Suppose that the signal in the interval Δtd has, in addition to very low DTMF tonal power, very low noise power. This can occur when the valid tones have a very high signal-to-noise ratio (SNR). Then, if the threshold T is set too low it is possible for the ratio of the total DTMF tonal power to the total signal power to exceed the threshold, T. This would erroneously cause the variable PAUSE to remain false. The value of T that will satisfy the ITU pause constraint may be determined experimentally by injecting valid DTMF signals with various interdigit times and power levels into system 5 and setting the threshold, T, to ensure that the system operates within the constraints.

For the system herein described with the given static threshold level of −33 dBm a suitable value of T was determined to be about 0.35. A value of 0.4 was found to be too high because at 8 dB SNR, which is the minimum SNR at which the implemented detector can detect valid signals, tone interruptions of 10 msec caused detection of distinct tones. The value of 0.2 was found to be too low because system 5 could not distinguish between two tones separated by more than 40 msec when signal-to-noise ratio is 99 dB. With the threshold, T, set at 0.35 the shortest tone interruption that causes a new tone detection is 11 msec at a signal-to-noise ratio of 8 dB. The longest tone pause for which system S will not detect a new tone is 31 msec at a signal-to-noise ratio of 99 dB. It will be understood that the range of values for T that will result in satisfactory performance of system 5 within ITU constraints will vary with the precision of the machine used to implement system 5, the static threshold level, the frame size, the level of signal attenuation and other parameters. It will further be recognized by persons of ordinary skill in the art that the ITU timing constraints can also be achieved with modifications to the basic logic structure of FSM 100, without departing from the principles of the present invention given the disclosure made herein.

Implementation of the methods for DTMF detection disclosed herein results in considerable computational efficiency. The computational requirements to implement the present invention using a Motorola 56000 DSP, have been estimated. The detector of system 5 processes each input sample using 14 Goertzel filters. Each filter requires 8 instructions/sample and 3 words/sample of data memory. The total signal power calculation requires 3 instructions/sample and one word of data memory. At the end of each 106-sample frame, 24 instructions are required to calculate the power for the four high band filters, 21, 22, 23, and 24, and twenty four instructions to calculate the power for four of the low band filters, 31, 32, 33, and 34, or 41, 42, 43 and 44, sixty instructions for the remaining computations of signal analyzer 80, and eight instructions for finite state machine 100. At 8000 samples per second, the detector requires approximately 1 Million Instructions Per Second (MIPS), 75 words of read/write data memory, and 75 words for storage of constants. Note that the Goertzel filter calculations plus the total signal power calculation comprise about 98% of the estimated computation time and 40% of the estimated data memory required by system 5. Using the detector to decode 24 telephone channels of a T1 line requires about 24 MIPS, about 800 words of data memory, and about 1000 words of program memory. These requirements can easily be met by fixed-point digital signal processors such as the Motorola 56000 and the Texas Instruments TMS320C50. Computational estimates of instructions per second, data memory, and program memory, is within the skill of persons of ordinary skill and the art and can be made for other digital signal processors as well. In a fixed point implementation it is necessary to scale the signal inputs to avoid overflow. Therefore, in a preferred embodiment the input to filter blocks 20, 30, 40, and 50 may be scaled by $1/128$ to avoid overflow. The input to the total power computation implemented by signal analyzer 80 may be scaled by $1/16$ to avoid overflow. A person of ordinary skill in the art will readily recognize how to implement appropriate scaling of inputs to avoid overflow.

Given the disclosure herein, System 5 may be prototyped using version 0.7 of the Ptolemy software environment which is freely distributed by the University of California at Berkely, (http://ptolemy.eecs.berkeley.edu), and may be tested with signals generated by a suitable signal generator to determine the parameters that will cause the system to conform to ITU requirements. Moreover, any or all of the functions described herein may readily be implemented by persons of ordinary skill in the art utilizing other systems such as programmable microprocessors, microcontrollers and/or application specific integrated circuits. The description of the preferred embodiments of the present invention do not limit the scope of the invention, as it will be recognized by persons of ordinary skill in the art that variations of the preferred embodiments may be implemented without departing from the principles of the present invention.

We claim:

1. A method for detection of DTMF symbols in a signal, comprising the steps of:

detecting the power at each DTMF frequency;

analyzing the detected power to determine whether a DTMF symbol has been received; and analyzing the detected power to determine whether the signal representing the symbol satisfies specified timing constraints;

wherein the step of analyzing the detected power to determine whether the signal satisfies specified timing constraints further comprises:

analyzing the detected power in each frame of a succession of frames to determine whether the signal is greater than a first specified duration;

analyzing the detected power in each of said frames to determine if the signal is less than a second specified duration; wherein said second specified duration is greater than said first specified duration;

analyzing the detected power in each of said frames to determine if the signal is not interrupted for a duration of time that is greater than or equal to a third specified duration; and analyzing the detected power in each frame of said frames to determine if the signal is not interrupted for a duration of time that is greater than or equal to a fourth specified duration; wherein said fourth specified duration is greater than said third specified duration.

2. The method of claim 1, wherein the step of detecting the power at each DTMF frequency further comprises the steps of:

determining the power in the signal at each high band DTMF frequency in each frame of a first succession of frames each of constant duration, $L_1$;

determining the power in the signal at each low band DTMF frequency in each frame of a second and third succession of frames each of constant duration, $L_2$, equals twice $L_1$;

wherein the end of each frame of the second succession of frames coincides with the end of a frame of the first succession of frames and is offset from the end of a frame of the third succession of frames by the duration, $L_1$.

3. The method of claim 2, wherein the frame lengths $L_1$ and $L_2$ are selected such that:

a filter operating over a frame of length $L_1$ for detecting power at a high band DTMF frequency will achieve sufficient frequency selectivity to accept signal energy in a frequency band that is within ±1.5% of a nominal high band DTMF frequency and substantially reject signal energy outside a frequency band that is within ±3.5% of a nominal high band DTMF frequency; and such that a filter operating over a frame of length $L_2$ for detecting power at a low band DTMF frequency will achieve sufficient frequency selectivity to accept signal energy in a frequency band that is within ±1.5% of a nominal low band DTMF frequency and substantially reject signal energy outside a frequency band that is within ±3.5% of a nominal low band DTMF frequency.

4. The method of claim 1, further comprising the steps of:

determining which symbol has been received;

determining the power at a frequency that is the first harmonic of the high band DTMF frequency of the received DTMF symbol;

forming a first ratio of the power at said harmonic of said high band DTMF frequency to the power at said high band DTMF frequency;

determining that said symbol is voice-simulated if said ratio does not exceed a specified threshold level;

determining if said received symbol is one of a subset of DTMF symbols consisting of "1," "3," "4," "5," "6," "7," "8," "9," "0," "A," "B," and "D,"

determining the power at a frequency that is the first harmonic of the low band DTMF frequency of the received DTMF symbol if said symbol is one of said subset;

forming a second ratio of the power at said harmonic of said low band DTMF frequency to the power at said low band DTMF frequency; and determining that if said symbol is one of said subset, then said symbol is voice-simulated if said second ratio does not exceed a specified threshold level.

5. The method of claim 1, further comprising the step of:

determining that a valid DTMF tone has not been received if the ratio of the total power of the strongest high band DTMF frequency plus the total power in the strongest low band DTMF frequency to the total signal power does not exceed a specified threshold level; wherein the specified threshold level is an optimal level for the symbol represented by said strongest low and high band tones.

6. A method for analyzing the signal power of a signal in each frame of a succession of frames to determine whether the signal is greater than a specified duration, comprising the steps of:

determining that a first condition is satisfied if the signal power in each of two adjacent frames, m and m+1, exceeds a first specified threshold power level in each of said frames;

forming a first ratio of the signal power in a first frame, m, of said two adjacent frames, and the signal power in a frame, m−1, next preceding said first frame, m;

determining that a second condition is satisfied if the first ratio exceeds a second specified threshold level;

forming a second ratio of the signal power in a second frame, m +1, of said two adjacent frames, and the signal power in a frame, m+2, next subsequent to said second frame, m+1;

determining that a third condition is satisfied if the second ratio exceeds the second specified threshold level;

concluding that the signal is greater than the specified duration if said first and second conditions are satisfied or if said first and third conditions are satisfied.

7. A method for analyzing the signal power of a signal in each frame of a succession of frames to determine whether the signal is less than a specified duration, comprising the steps of:

determining that a first condition exists if the signal power in each of two adjacent frames, m and m+1, exceeds a first specified threshold power level in each of said two adjacent frames;

determining that a second condition exists if the signal power in a frame, m−1, next preceding a first frame, m, of said two adjacent frames exceeds said first specified threshold power level;

forming a first ratio of the signal power in the first frame, m, of said two adjacent frames, and the signal power in the frame, m−1, next preceding said first frame, m;

determining that a third condition is satisfied if the first ratio exceeds a second specified threshold level;

forming a second ratio of the signal power in a second frame, m+1, of said two adjacent frames, and the signal power in a frame, m+2, next subsequent to said second frame, m+1;

determining that a fourth condition is satisfied if the second ratio exceeds a second specified threshold level; and concluding that the signal is less than the specified duration if the first condition is not satisfied or the first condition is satisfied but the second, third and fourth conditions are not satisfied.

8. A system for detection of DTMF symbols in a signal, comprising a plurality of filters for detecting the power at each DTMF frequency;

a signal analyzer for analyzing the detected power to determine whether a DTMF symbol has been received; and a finite state machine for analyzing the detected power to determine whether the signal representing the symbol satisfies specified timing constraints; and wherein said finite state machine for analyzing the detected power to determine whether the signal satisfies specified timing constraints further comprises:

a system for analyzing the detected power in each frame of a succession of frames to determine whether the signal is greater than a first specified duration;

a system for analyzing the detected power in each of said frames to determine if the signal is less than a second specified duration; wherein said second specified duration is greater than said first specified duration;

a system for analyzing the detected power in each of said frames to determine if the signal is not interrupted for a duration of time that is greater than or equal to a third specified duration; and a system for analyzing the detected power in each of said frames to determine if the signal is not interrupted for a duration of time that is greater than or equal to a fourth specified duration; wherein said fourth specified duration is greater than said third specified duration.

9. A system for analyzing the signal power of a signal in each frame of a succession of frames to determine whether the signal is greater than a specified duration, comprising:

a system for determining that a first condition is satisfied if the signal power in each of two adjacent frames, m and m+1, exceeds a first specified threshold power level in each of said frames;

a system for forming a first ratio of the signal power in a first frame, m, of said two adjacent frames, and the signal power in a frame, m−1, next preceding said first frame, m;

a system for determining that a second condition is satisfied if the first ratio exceeds a second specified threshold level;

a system for forming a second ratio of the signal power in a second frame, m+1, of said two adjacent frames, and the signal power in a frame, m+2, next subsequent to said second frame, m+1;

a system for determining that a third condition is satisfied if the second ratio exceeds the second specified threshold level;

a system for concluding that the signal is greater than the specified duration if said first and second conditions are satisfied or if said first and third conditions are satisfied.

10. A system for analyzing the signal power of a signal in each frame of a succession of frames to determine whether the signal is less than a specified duration, comprising:

a system for determining that a first condition exists if the signal power in each of two adjacent frames, m and m+1, exceeds a first specified threshold power level in each of said two adjacent frames;

a system for determining that a second condition exists if the signal power in a frame, m−1, next preceding a first frame, m, of said two adjacent frames exceeds said first specified threshold power level;

a system for forming a first ratio of the signal power in the first frame, m, of said two adjacent frames, and the signal power in the frame, m−1, next preceding said first frame, m;

a system for determining that a third condition is satisfied if the first ratio exceeds a second specified threshold level;

a system for forming a second ratio of the signal power in a second frame, m+1, of said two adjacent frames, and the signal power in a frame, m+2, next subsequent to said second frame, m+1;

a system for determining that a fourth condition is satisfied if the second ratio exceeds a second specified threshold level; and a system for concluding that the signal is less than the specified duration if the first condition is not satisfied or the first condition is satisfied but the second, third and fourth conditions are not satisfied.

* * * * *